(12) United States Patent  
Bietenbeck et al.

(10) Patent No.: US 9,902,020 B2  
(45) Date of Patent: Feb. 27, 2018

(54) DRIVE TRAIN DEVICE FOR A MOTOR VEHICLE AND PRODUCTION PROCESS FOR A DRIVE TRAIN DEVICE

(71) Applicant: Daimler AG, Stuttgart (DE)

(72) Inventors: Hans-Josef Bietenbeck, Korb (DE); Kai Heukelbach, Koengen (DE); Bernd Koppitz, Winterbach (DE); Thomas Lechthaler, Bad Orb (DE); Tobias Schuster, Esslingen (DE); Bernhard Ziegler, Rechberghausen (DE)

(73) Assignee: Daimler AG, Stuttgart (DE)

( * ) Notice: Subject to any disclaimer, the term of this patent is extended or adjusted under 35 U.S.C. 154(b) by 313 days.

(21) Appl. No.: 14/647,783

(22) PCT Filed: Nov. 15, 2013

(86) PCT No.: PCT/EP2013/003454  
§ 371 (c)(1),  
(2) Date: May 27, 2015

(87) PCT Pub. No.: WO2014/082713  
PCT Pub. Date: Jun. 5, 2014

(65) Prior Publication Data  
US 2015/0328720 A1  Nov. 19, 2015

(30) Foreign Application Priority Data

Nov. 28, 2012  (DE) .................. 10 2012 023 156

(51) Int. Cl.  
*F16H 41/30*  (2006.01)  
*F16H 41/28*  (2006.01)  
(Continued)

(52) U.S. Cl.  
CPC ............ *B23K 31/02* (2013.01); *B23K 33/008* (2013.01); *F16H 41/28* (2013.01); *F16H 41/30* (2013.01);  
(Continued)

(58) Field of Classification Search  
None  
See application file for complete search history.

(56) References Cited

U.S. PATENT DOCUMENTS 2,839,826 A    6/1958  Farrell  
3,981,614 A *  9/1976  Helmer .................. F16D 33/20  
                                                  416/180  
(Continued)

FOREIGN PATENT DOCUMENTS

DE          694 00 828 T2   3/1997  
DE   10 2008 008 857 A1    8/2009  
(Continued)

OTHER PUBLICATIONS

Japanese Office Action issued in Japanese counterpart application No. 2015-544373 dated Jun. 21, 2016, with partial English translation (Eight (8) pages).

(Continued)

*Primary Examiner* — Jacob S Scott  
(74) *Attorney, Agent, or Firm* — Crowell & Moring LLP

(57) ABSTRACT

A drive train device for a motor vehicle is disclosed. The drive train device has a first component, a second component which is connected to the first component so as to transmit torque and consists at least substantially of a material formed from lightweight metal, and at least one element which is at least partially enclosed in the second component and which consists at least substantially of a predominantly iron-containing material. The enclosed element is a connecting element which is connected to the first component by (Continued)

substance-to-substance bonding in order to produce the torque-transmitting connection. The first component and/or the second component at least partially form a housing. The enclosed element projects axially on both sides out of the material of the second component and at least one side of the enclosed element which projects axially has at least one balancing element and/or at least one balancing recess.

8 Claims, 3 Drawing Sheets

(51) Int. Cl.
    *B23K 33/00*     (2006.01)
    *B23K 31/02*     (2006.01)
    *F16H 41/24*     (2006.01)
    *B23K 101/00*     (2006.01)
    *B23K 103/04*     (2006.01)
    *B23K 103/10*     (2006.01)
    *B23K 103/20*     (2006.01)

(52) U.S. Cl.
    CPC .... *B23K 2201/006* (2013.01); *B23K 2203/04* (2013.01); *B23K 2203/10* (2013.01); *B23K 2203/20* (2013.01); *F16H 2041/243* (2013.01); *Y10T 403/478* (2015.01)

(56) References Cited

U.S. PATENT DOCUMENTS

| | | | |
|---|---|---|---|
| 4,825,521 A * | 5/1989 | Frotschner | F16H 41/28 228/162 |
| 6,428,276 B1 * | 8/2002 | Chasseguet | F16H 41/28 416/180 |
| 2008/0067216 A1 * | 3/2008 | Sano | B23K 20/1225 228/114.5 |
| 2017/0009864 A1 * | 1/2017 | Heukelbach | F16H 41/24 |

FOREIGN PATENT DOCUMENTS

| | | |
|---|---|---|
| DE | 10 2009 042 050 A1 | 4/2010 |
| EP | 0 022 071 A1 | 1/1981 |
| EP | 0 610 979 A1 | 8/1994 |
| EP | 1 900 468 A2 | 3/2008 |
| GB | 528616 A | 11/1940 |
| GB | 2 285 005 A | 6/1995 |
| JP | 59-131654 U | 9/1984 |
| JP | 7-12650 U | 3/1995 |
| JP | 2009-168116 A | 7/2009 |

OTHER PUBLICATIONS

PCT/EP2013/003454, International Search Report dated Mar. 6, 2014, with partial English translation (Eight (8) pages).
PCT/EP2013/003454, German-language Written Opinion dated Mar. 6, 2014 (Five (5) pages).
German Search Report dated Aug. 7, 2013, (Six (6) pages).

* cited by examiner

DRIVE TRAIN DEVICE FOR A MOTOR VEHICLE AND PRODUCTION PROCESS FOR A DRIVE TRAIN DEVICE

This application claims the priority of International Application No. PCT/EP2013/003454, filed Nov. 15, 2013, and German Patent Document No. 10 2012 023 156.3, filed Nov. 28, 2012, the disclosures of which are expressly incorporated by reference herein.

BACKGROUND AND SUMMARY OF THE INVENTION

The invention relates to a drive train device and to a production method.

A drive train device for a motor vehicle having a first component, a second component which is connected to the first component so as to transmit torque and consists of a material formed from lightweight metal, and an element which is enclosed in the second component and which consists of an iron-containing material is already known from EP 1 900 468 A2.

A drive train device for a motor vehicle having a first component, a second component which is connected to the first component so as to transmit torque and consists at least substantially of a material formed from lightweight metal, and at least one element which is at least partially enclosed in the second component and which consists at least substantially of a predominantly iron-containing material is likewise disclosed in the generic U.S. Pat. No. 2,839,826 A. Further, it is shown by this publication that the enclosed element is designed as a connecting element which is connected to the first component by substance-to-substance bonding in order to produce the torque-transmitting connection. This publication also shows that the first component and/or the second component at least partially form a housing.

The invention is based in particular on the object of economically producing a drive train device in lightweight design.

The invention starts from a drive train device for a motor vehicle having a first component, a second component which is connected to the first component so as to transmit torque and consists at least substantially of a material formed from lightweight metal, and at least one element which is at least partially enclosed in the second component and which consists at least substantially of a predominantly iron-containing material. "Enclosed" is understood to mean cast-in or forged-in.

Further, it is assumed that the enclosed element is designed as a connecting element which is connected to the first component by substance-to-substance bonding in order to produce the torque-transmitting connection. This enables the components to be connected to one another by means of the enclosed element, as a result of which the first component and the second component can be made from different materials. Particularly advantageously, the first component can consist at least substantially of a predominantly iron-containing material, wherein, as a result of the substance-to-substance bonded connection to the enclosed element, the second component, which consists at least substantially of the material formed from lightweight metal, and the first component, which consists at least substantially of the predominantly iron-containing material, can be connected by means of a connection between identical materials. The substance-to-substance bonded connection of the enclosed element to the first component enables an elaborate and cost-intensive connection technology, such as in particular screw connection, riveting and welding/riveting, to be dispensed with, as a result of which costs of the drive train device in lightweight design can be reduced. As a result, at least two components of the drive train device, wherein one of the components consists of the material formed from lightweight metal, can be connected to one another so as to transmit torque particularly cost effectively, thus enabling a drive train device in lightweight design to be produced economically. An "enclosed element" is understood in particular to mean an element which is connected to the second component in an interlocking manner by means of a casting process or a forging process of the second component. The connecting element is advantageously designed in the form of a ring, as a result of which the connection between the second component and the enclosed element can be formed more reliably. Preferably, the first component consists at least substantially of a predominantly iron-containing material, as a result of which the substance-to-substance bonded connection between the element enclosed in the second component and the first component can be formed more reliably. Preferably, the element enclosed in the second component and the first component are welded and/or brazed to one another. "Substantially" is understood to mean particularly at least 60%, advantageously at least 80% and particularly advantageously at least 90%. A "lightweight metal" is understood to mean particularly a metal and/or an alloy, the density of which lies below 5 g/cm$^3$, such as in particular aluminum.

Further, it is assumed that the first component and/or the second component at least partially form a housing. As a result, further components can be arranged within the first component and the second component in an assembly-friendly manner, as a result of which an assembly-friendly housing in lightweight design can be produced cost effectively. The substance-to-substance bonded connection of the enclosed element to the first component, which is in the form of a housing, enables a laborious adjustment of an axial play between the first component, which is in the form of a housing, and the second component, which is in the form of a housing, to be avoided, wherein compensating elements, which are necessary, for example, with a screw connection, can be dispensed with, in particular when assembling the housing. Further, the substance-to-substance bonded connection enables seals between the first component and the second component to be dispensed with, as a result of which costs can be reduced and assembly simplified. A "housing" is understood in particular to mean a component which at least partially encompasses and/or accommodates a further component of the drive train device.

According to the invention, it is proposed that the enclosed element projects axially on both sides out of the material of the second component and at least one side of the enclosed element which projects axially out of the material of the second component has at least one balancing element and/or at least one balancing recess, thus enabling an out-of-balance to be eliminated particularly cost effectively. This enables a positive balancing, in which additional balancing material is attached, and a negative balancing, in which a balancing material is removed, to be realized with the help of the enclosed element, as a result of which balancing can be carried out particularly easily. The term "axially" is in particular referred to an axis of rotation of the first component and/or of the second component, so that the expression "axially" denotes a direction which runs on the axis of rotation or at least substantially parallel thereto. "Substantially parallel" is understood in particular to mean a deviation from a parallel course which is a maximum of 20 degrees, advantageously a maximum of 10 degrees and particularly advantageously a maximum of 5 degrees.

In particular, it is advantageous when the enclosed element has at least one material void which, in an enclosed state, is at least substantially filled by the material of the second component, as a result of which a particularly reliable interlocking connection between the second component, which, in order to reduce weight, consists at least substantially of a material formed from lightweight metal, and the enclosed element, which consists at least substantially of a predominantly iron-containing material, can be provided.

In order to improve lubrication and/or cooling, it is further advantageous when the second component at least partially forms a scoop device which is provided to scoop up a lubricant and/or coolant, as a result of which the lubricant and/or coolant can be scooped up and/or conveyed without cost-intensive pumps. Integrating the scoop device into the second component enables production of the scoop device to be simplified and/or even realized at all. In particular, "provided" is understood to mean specially designed, equipped and/or arranged. In particular, "one piece" is understood to mean formed in and/or from one piece, such as, in particular, by production from a casting.

Further, it is advantageous when the scoop device is arranged radially outside the enclosed element, as a result of which the lubricant and/or coolant can be scooped up advantageously. The term "radially" is in particular referred to an axis of rotation of the first component and/or of the second component, so that the expression "radially" denotes a direction which runs at least substantially perpendicular to the axis of rotation. "Substantially perpendicular" is understood in particular to mean a deviation from a perpendicular course which is a maximum of 20 degrees, advantageously a maximum of 10 degrees and particularly advantageously a maximum of 5 degrees.

In a further embodiment according to the invention, the first component at least partially forms a pump wheel of a torque converter. This enables the pump wheel of the torque converter to be connected particularly reliably to the second component, which consists at least partially of the material formed from lightweight metal, as a result of which a torque converter in lightweight design can be produced cost effectively.

In particular, it is advantageous when the second component at least partially forms an external disk support. This enables the external disk support to be connected particularly reliably to the first component, which consists at least substantially of a predominantly iron-containing material, as a result of which a clutch device in lightweight design can be produced cost effectively. If the first component at least substantially forms the pump wheel of the torque converter and the second component at least substantially the external disk support, this enables a cost-effective torque converter with a converter bridging clutch in lightweight design to be provided.

Further, a production method for a drive train device of a motor vehicle, in particular for a drive train device according to the invention, is proposed, in which a first component and a second component, which is produced at least partially from a material formed from lightweight metal, are connected to one another so as to transmit torque, and at least one element produced at least partially from a predominantly iron-containing material is at least partially enclosed in the first component, wherein the first component and the enclosed element are connected to one another by substance-to-substance bonding in order to produce the torque-transmitting connection. This enables production costs for the production of the drive train device in lightweight design to be saved.

To simplify assembly, for the production method, it is further proposed that the first component and/or the second component accommodate at least one third component, wherein, following pre-assembly of the at least one third component, an axial play between the first component and the second component is adjusted and, dispensing with compensating elements, the first component and the enclosed element are connected to one another by substance-to-substance bonding, as a result of which assembly costs can be saved.

Further advantages can be seen from the following description of the figures. Two exemplary embodiments of the invention are shown in the figures. The figures, the description of the figures and the claims contain numerous characteristics in combination. Expediently, the person skilled in the art will also consider the features singly and combine them to form meaningful further combinations.

DETAILED DESCRIPTION OF THE DRAWINGS

Figure 1:
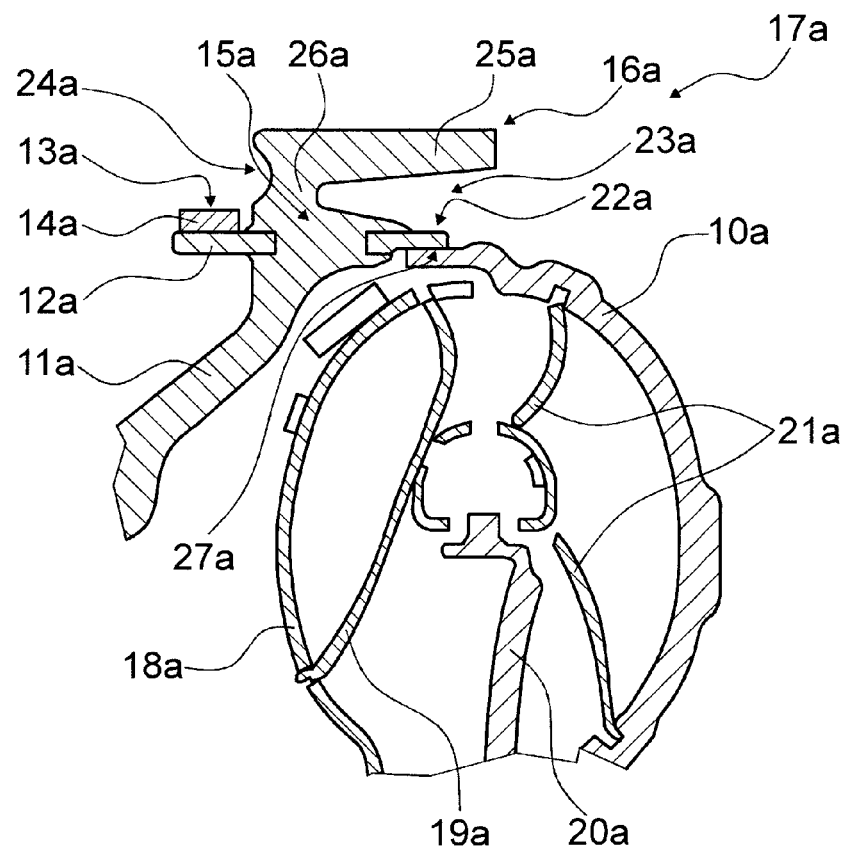
FIG. 1 shows, partially and schematically, a drive train device having a first component in the form of a pump wheel of a torque converter, a second component in the form of an external disk support of a disconnect clutch, and an element which is cast into the second component and is connected to the first component by substance-to-substance bonding.
Figure 2:
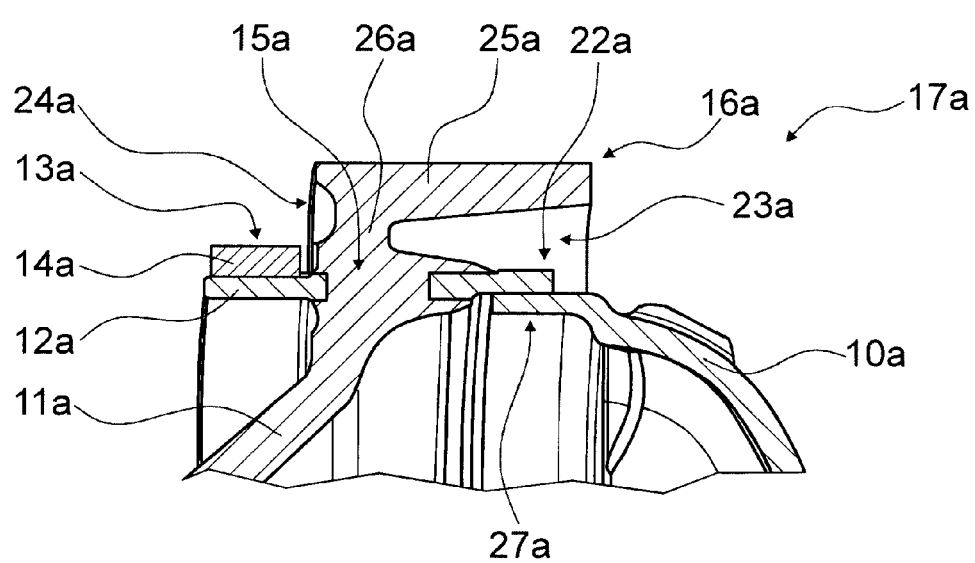
FIG. 2 shows the drive train device in the region of the cast-in element.
Figure 3:
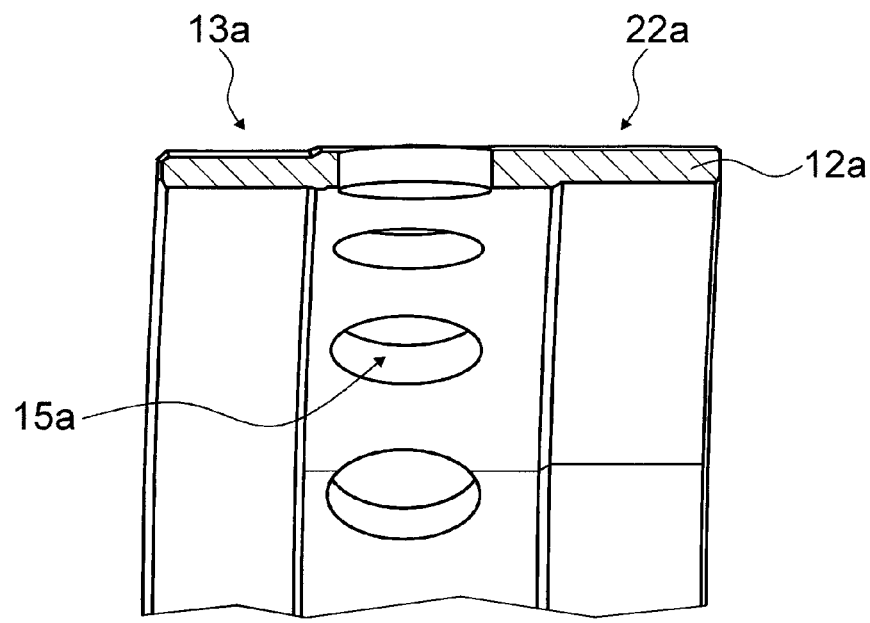
FIG. 3 shows the cast-in element.

FIGS. 1 to 3 show a drive train device for a motor vehicle which is provided for a drive train of the motor vehicle. The drive train device has an automatic gearbox and a hydraulic torque converter 17a with a drive bridging clutch. Here, the torque converter 17a has a pump wheel, a turbine wheel and an idler wheel. The torque bridging clutch has an external disk support, which is connected to the pump wheel in a fixed rotational relationship, and an internal disk support, which is connected to the turbine wheel in a fixed rotational relationship.

Further, the drive train device has a first component 10a and a second component 11a which are connected to one another so as to transmit torque. To accommodate the first component 10a and the second component 11a, the drive train device has a housing, which is not shown in more detail, within which the first component 10a and the second component 11a are arranged. Here, the first component 10a and the second component 11a are mounted so that they can rotate relative to the housing (not shown). In order to realize a lightweight design, the second component 11a consists of a material formed from lightweight metal. The second component 11a consists of aluminum. Here, the second component 11a is in the form of a cast component. The second component 11a is therefore cast. The first component 10a consists of a predominantly iron-containing material. The first component 10a consists of steel. Alternatively, the second component 11a could also be in the form of a forged part.

In order to connect the first component 10a, which consists of steel, and the second component 11a, which consists of aluminum, to one another, the drive train device has an element 12a which is cast into the second component 11a, which consists of aluminum. Alternatively, the element 12a could also be forged into the second component 11a. The cast-in element 12a consists of a predominantly iron-containing material. It consists of steel. As a result of the casting-in process, an interlocking connection is provided between the second component 11a, which consists of aluminum, and the element 12a, which consists of steel. The cast-in element 12a is in the form of a connecting element which provides the torque-transmitting connection between the first component 10a and the second component 11a. For this purpose, the first component 10a and the element 12a, which is cast into the second component 11a, are connected to one another by substance-to-substance bonding. The cast-in element 12a and the first component 10a therefore have a substance-to-substance connecting point 27a. In this exemplary embodiment, the first component 10a, which consists of steel, and the cast-in element 12a, which consists of steel, are welded to one another. They are connected to one another by means of a welded joint. The first component 10a, which consist of steel, and the second component 11a, which consists of aluminum, are connected to one another by means of the element 12a which is cast into the second component 11a. The substance-to-substance connecting point 27a is in the form of a weld. The first component 10a and the second component 11a are connected to one another by means of a steel-steel joint. Basically, the first component 10a and the cast-in element 12a can alternatively or additionally be brazed and/or glued to one another. In order to save costs, the cast-in element 12a can basically be made from sheet metal strips like a jigsaw puzzle.

The cast-in element 12a projects axially on both sides out of the material of the second component 11a. The cast-in element 12a has a first side 22a which projects axially out of the material of the second component 11a and a second side 13a which projects axially out of the material of the second component 11a. The first axially projecting side 22a of the cast-in element 12a is provided for making a substance-to-substance connection to the first component 10a. The cast-in element 12a is connected by substance-to-substance bonding to the first component 10a by means of the first axially projecting side 22a. The axially opposing second axially projecting side 13a of the cast-in element 12a is provided for balancing. The second axially projecting side 13a has a balancing element 14a for balancing. The balancing element 14a is securely arranged on the second axially projecting side 13a on the cast-in element 12a in order to eliminate an out-of-balance. The balancing element 14a is in the form of a balancing plate. Basically, the second axially projecting side 13a can additionally or alternatively have at least one balancing recess for balancing which is in the form of a material removal. Further, it is basically conceivable for positive balancing to be carried out by CMT welding on the second axially projecting side 13a.

In order to make a cast connection between the second component 11a and the cast-in element 12a more reliable, the cast-in element 12a has a plurality of material voids 15a which, in a cast-in state, are filled by the material of the second component 11a. Here, the material voids 15a are arranged axially between the axially projecting sides 13a, 22a. The material voids 15a are arranged uniformly around a circumference of the cast-in element 12a. They are formed as holes. The cast-in element 12a is in the form of a ring. It is in the form of a connecting ring.

The first component 10a and the second component 11a in each case form a housing of the torque converter 17a. Components 18a, 19a, 20a, 21a of the torque converter 17a are arranged within the first component 10a and the second component 11a. The first component 10a and the second component 11a are in each case in the form of a converter housing part. Here, the first component 10a forms the pump wheel of the torque converter 17a in one piece and the second component 11a forms the external disk support of the converter bridging clutch in one piece. The component 18, which is arranged within the components 10a, 11a, is in the form of the turbine wheel, the components 19a, which are arranged within the components 10a, 11a, are in each case in the form of a turbine wheel blade, the component 20a, which is arranged within the components 10a, 11a, is in the form of the idler wheel, and the components 21a, which are arranged within the components 10a, 11a, are in each case in the form of a pump wheel blade of the torque converter 17a. The external disk support is therefore made of aluminum and connected to the pump wheel of the torque converter 17a, which is made of steel, by means of the cast-in element 12a, the pump wheel and the cast-in element 12a being connected to one another for this purpose. Basically, the first component 10a can merely be securely connected to the pump wheel of the torque converter 17a, and the second component 11a to the external disk support of the converter bridging clutch.

Further, the drive train device has a scoop device 16a, which, during a rotation, carries with it and therefore scoops up a coolant from a coolant sump due to adhesion. In doing so, the scoop device 16a conveys the coolant to a higher level, from which it flows down again on the first component 10a and on the second component 11a due to gravity. The second component 11a forms the scoop device 16a in one piece. With respect to an axis of rotation of the first component 10a and the second component 11a, the scoop device 16a is arranged radially outside the cast-in element 12a. The scoop device 16a encompasses the first axially projecting side 22a of the cast-in element 12a. Here, the coolant is in the form of an oil.

The scoop device 16a has a first face-side material void 23a and an opposing second face-side material void 24a. The material voids 23a, 24a form depressions which are open in the axial direction. At the same time, they each run on the face side around the circumference of the scoop device 16a. With respect to the axis of rotation, the first material void 23a is arranged radially above the first axially projecting side 22a of the cast-in element 12a. The material voids 23a, 24a have different dimensions. Here, the first material void 23a is larger than the second material void 24a. The first material void 23a is axially deeper than the second material void 24a. The material voids 23a, 24a are in each case formed by casting the second component 11a. They are each annular in shape.

Due to the axially opposing material voids 23a, 24a, the scoop device 16a has a scoop ring 25a and a material constriction 26a. The material constriction 26a connects the second component 11a and the scoop ring 25a to one another in one piece. Here, the scoop ring 25a is arranged radially above the material constriction 26a. The scoop ring 25a and the material constriction 26a run circumferentially around a circumference of the second component 11a. The scoop ring 25a has different axial extensions starting from the material restriction 26a. Here, an axial extension of the scoop ring 25a starting from the material constriction 26a in the direction of the first axially projecting side 22a of the cast-in element 12a is greater than an axial extension of the scoop ring 25a starting from the material constriction 26a in the direction of the second axially projecting side 13a of the cast-in element 12a. Starting from the material constriction 26a, the scoop ring 25a extends axially substantially in the direction of the first axially projecting side 22a of the cast-in element 12a. The scoop ring 25a forms a roof over the first axially projecting side 22a of the cast-in element 12a. The scoop ring 25a therefore forms a roof over the substance-to-substance connecting point 27a. In doing so, the first axially projecting side 22a of the cast-in element 12a is axially accessible due to the material void 23a. The scoop ring 25a does not form a roof over the second axially projecting side 13a of the cast-in element 12a. The scoop ring 25a therefore does not form a roof over the balancing element 14a. In a section along the axis of rotation, the scoop device 16a has the form of an anvil. Here, the scoop ring 25a, which is arranged radially above the material constriction 26a, extends substantially in the direction of the first axially projecting side 22a of the cast-in element 12a.

In a production method for producing the drive train device, the element 12a, which consists of the iron-containing material and is formed as a connecting element, is cast into the second component 11a, which consists of the material formed from lightweight metal, in order to produce an interlocking connection between the second component 11a and the connecting element. In order to bind the cast-in element 12a to the first component 10a, the cast-in element 12a is cast in in such a way that it projects axially on both sides out of the material of the second component 11a. In order to connect the second component 11a, which consists of the material formed from lightweight metal, and the first component 10a, which consists of the iron-containing material, to one another so as to transmit torque, the first axially projecting side 22a of the element 12a, which is cast into the second component 11a, is connected to the first component 10a by substance-to-substance bonding. The cast-in element 12a and the first component 10a are welded for this purpose.

For assembly, the internal components 18a, 19a, 20a, 21a are pre-assembled in the first component 10a and the second component 11a in a pre-assembly operation before the first component 10a and the cast-in element 12a are connected to one another by substance-to-substance bonding. After pre-assembly of the internal components 18a, 19a, 20a, 21a, a correct axial play is adjusted between the first component 10a and the second component 11a, and thereupon the first component 10a and the cast-in element 12a are connected to one another by substance-to-substance bonding without the use of play-compensating elements. The components 18a, 19a, 20a, 21a, which are arranged within the first component 10a and the second component 11a, are therefore initially adjusted axially with a correct play with respect to one another and only then are the first component 10a and the second cast-in element 12a welded to one another without the use of play-compensating elements. No play-compensating elements, such as adjusting washers, are therefore required.

Figure 4:
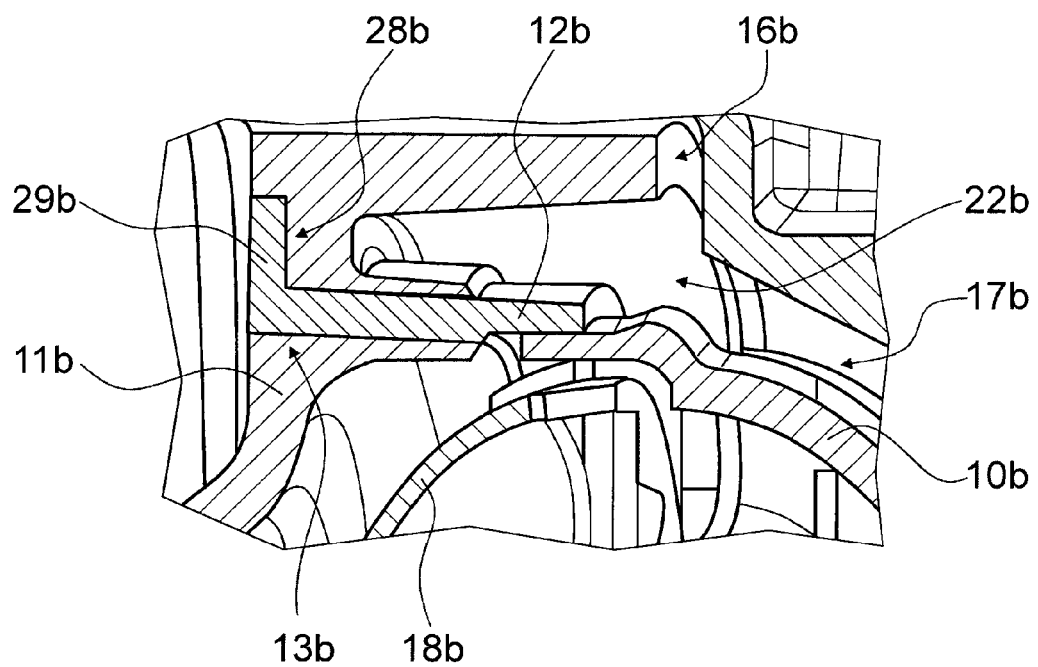
FIG. 4 shows a drive train device with an alternatively designed cast-in element.
Figure 5:
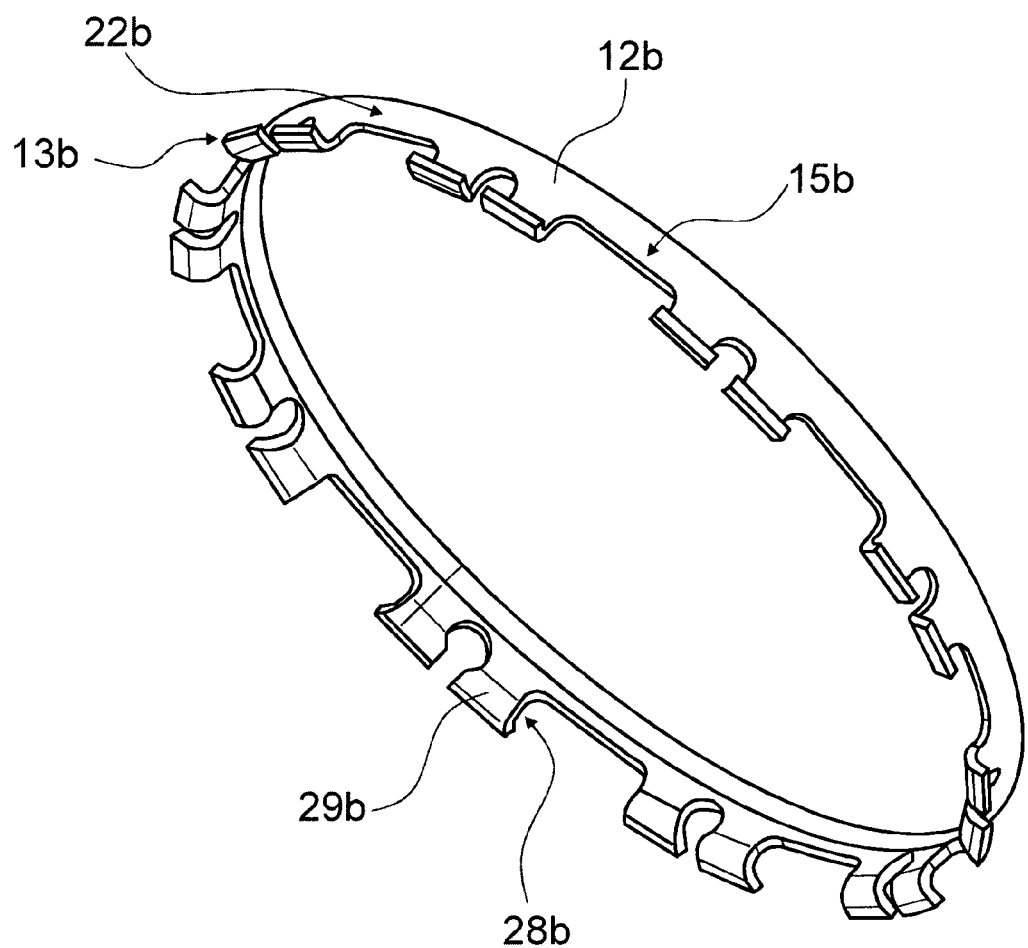
FIG. 5 shows the alternatively designed cast-in element.

A further exemplary embodiment of the invention is shown in FIGS. 4 and 5. The following description is substantially restricted to the differences between the exemplary embodiments, wherein, basically, reference can also be made to the figures and/or the description of the other exemplary embodiment of FIGS. 1 to 3 with regard to identically referenced components, in particular with regard to components with the same reference numbers. To differentiate between the exemplary embodiments, the letter a in the references for the exemplary embodiment in FIGS. 1 to 3 is replaced by the letter b in the references for the exemplary embodiment of FIGS. 4 and 5.

A second exemplary embodiment of a drive train device for a motor vehicle is shown in FIGS. 4 and 5. The drive train device has a first component 10b, which consists of a predominantly iron-containing material, a torque-transmitting second component 11b, which is connected to the first component 10b and which consists of a material formed from lightweight metal, and an element 12b, which is cast into the second component 11b and which consists of a predominantly iron-containing material, wherein the cast-in element 12b is in the form of a connecting element which is connected by substance-to-substance bonding to the first component 10b to produce the torque-transmitting connection. In doing so, the first component 10b forms a pump wheel of the torque converter 17b in one piece and the second component 11b a scoop device 16b in one piece and an external disk support in one piece. The first component 10b, which is in the form of a housing, and the second component 11b, which is in the form of a housing, accommodate further components 18b.

In contrast to the previous exemplary embodiment, the cast-in element 12b projects axially on one side out of the material of the second component 11b. The cast-in element 12b has a side 13b which is cast into the second component 11b and a second side 22b which projects axially out of the material of the second component 11b. The axially projecting side 22b of the cast-in element 12b is provided for making a substance-to-substance connection to the first component 10b. The cast-in element 12b is connected by substance-to-substance bonding to the first component 10b by means of the axially projecting side 22b. The axially opposing cast-in side 13b of the cast-in element 12b has an undercut 28b. The undercut 28b extends radially outwards with respect to an axis of rotation of the first component 10b and the second component 11b. The undercut 28b has a plurality of teeth 29b which are arranged distributed uniformly in pairs around a circumference of the cast-in element 12b. Further, the cast-in element 12b has material voids 15b which, in a cast-in state, are filled by the material of the second component 11b. In contrast to the previous exemplary embodiment, the material voids 15b are in the form of elongated holes which are axially open in a direction facing away from the projecting side 22b.

The invention claimed is:

1. A drive train device for a motor vehicle, comprising:
   a first component;
   a second component which is connected to the first component so as to transmit torque and which consists at least substantially of a material formed from lightweight metal; and
   an enclosed element which is at least partially enclosed in the second component and which consists at least substantially of a predominantly iron-containing material;
   wherein the enclosed element is a connecting element which is connected to the first component by substance-to-substance bonding to produce a torque-transmitting connection;
   wherein the first component or the second component at least partially form a housing;
   wherein the enclosed element projects axially on both sides out of the material of the second component and wherein at least one side of the enclosed element which projects axially out of the material of the second component has at least one balancing element or at least one balancing recess.

2. The drive train device as claimed in claim 1, wherein the enclosed element has at least one material void which, in an enclosed state, is at least substantially filled by the material of the second component.

3. The drive train device as claimed in claim 1, wherein the second component at least partially forms a scoop device, wherein a lubricant or a coolant is scoopable by the scoop device.

4. The drive train device as claimed in claim 3, wherein the scoop device is arranged radially outside the enclosed element.

5. The drive train device as claimed in claim 1, wherein the first component at least partially forms a pump wheel of a torque converter.

6. The drive train device as claimed in claim 1, wherein the second component at least partially forms an external disk support.

7. A production method for a drive train device of a motor vehicle, comprising the steps of:

connecting a first component and a second component, wherein the second component is produced at least partially from a material formed from lightweight metal, to one another so as to transmit torque, and wherein an enclosed element produced at least partially from a predominantly iron-containing material is at least partially enclosed in the second component;

wherein the first component and the enclosed element are connected to one another by substance-to-substance bonding to produce a torque-transmitting connection.

8. The production method as claimed in claim 7, wherein the first component or the second component accommodate at least one third component, wherein, following pre-assembly of the at least one third component, an axial play between the first component and the second component is adjusted and, without compensating elements, the first component and the enclosed element are connected to one another by the substance-to-substance bonding.

* * * * *